Oct. 31, 1967  A. R. TYRRELL ETAL  3,349,566
ROCKET ENGINES

Filed Aug. 14, 1964  4 Sheets-Sheet 2

United States Patent Office 3,349,566
Patented Oct. 31, 1967

3,349,566
ROCKET ENGINES
Albert Ralph Tyrrell and Michael S. Hunt, Coventry, England, assignors to Bristol Siddeley Engines Limited, Bristol, England
Filed Aug. 14, 1964, Ser. No. 389,744
Claims priority, application Great Britain, Aug. 16, 1963, 32,477/63
5 Claims. (Cl. 60—259)

The invention relates to a rocket engine to be used in an aircraft in addition to the main propulsive engine. The invention is also concerned with an aircraft in which such a rocket engine is fitted.

According to the invention, a rocket engine has co-axial rotary fuel and oxidant pumps, arranged at the upstream end of the combustion chamber of the engine with their common axis transverse to the longitudinal axis of the engine, and has trunnion mountings co-axial with the pumps, whereby the engine is arranged to be mounted in an aircraft and is pivotable about the said common axis between an operative position in which at least the nozzle of the engine extends from the outer surface of the aircraft and an inoperative position in which the engine is stowed within the aircraft.

The pumps may be mounted co-axially of a turbine of which the rotor is drivingly connected to the rotor of each pump.

The pumps may be arranged one at each end of the turbine, the respective pump inlet housings providing the trunnion mountings about which the engine is pivotable.

Means may also be provided to prevent operation of the engine when the latter is not in its operative position.

By way of example, a pivotally-mounted retractable rocket engine in accordance with the invention will now be described with reference to the accompanying drawings, in which.

Figure 4:
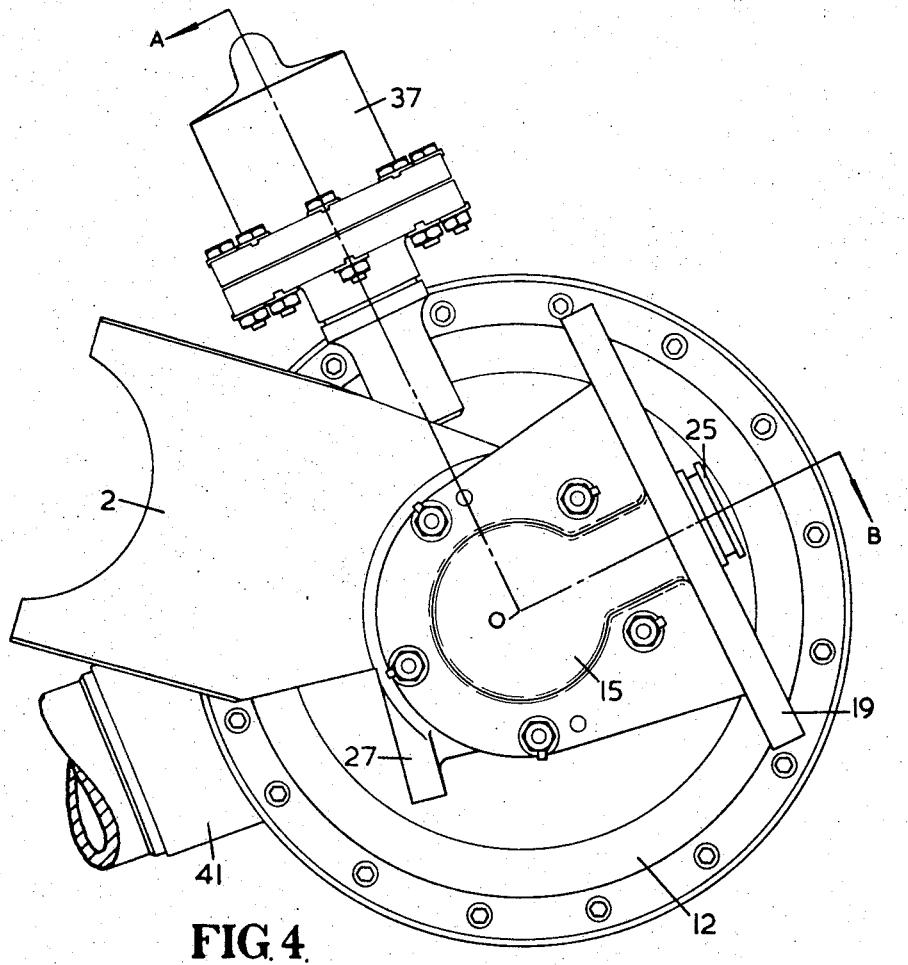
FIGURE 4 is a view of the opposite end of the pump and turbine assembly seen in FIGURE 2 to a larger scale.
Figure 2:
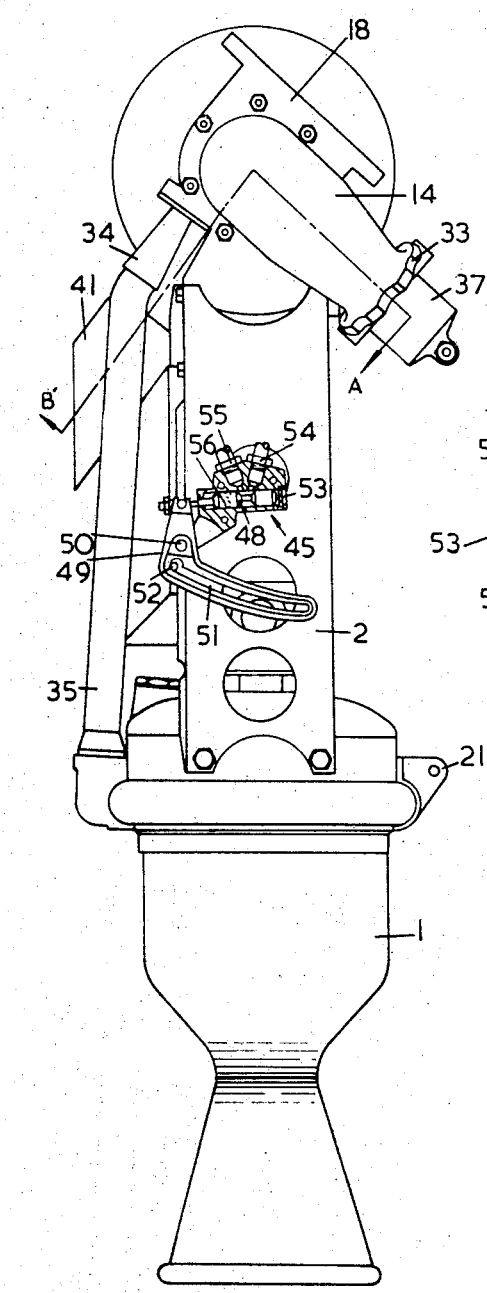
FIGURE 2 is a side view of the engine drawn to a larger scale.
Figure 3:
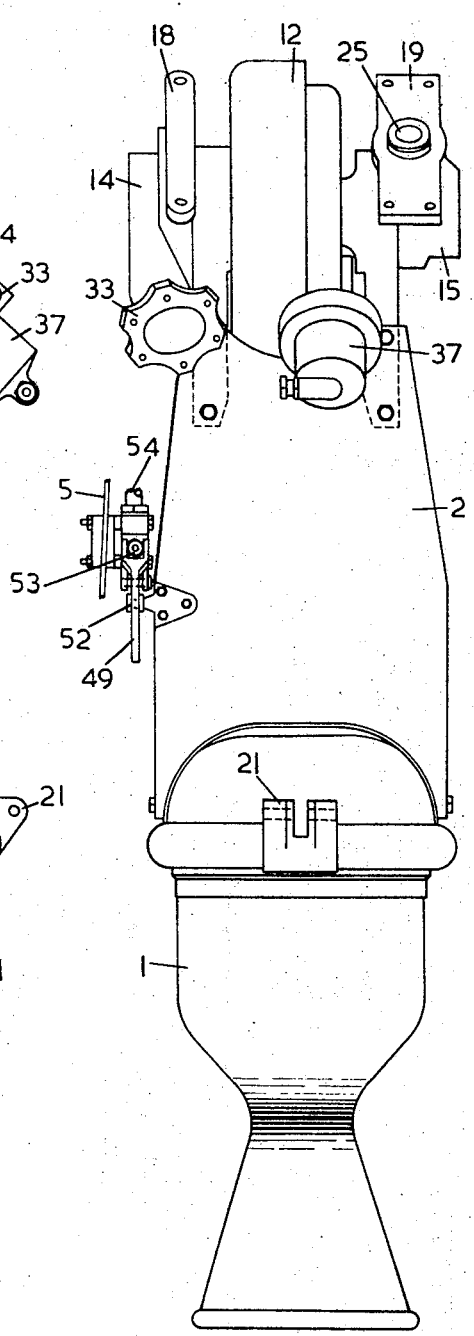
FIGURE 3 is a plan view of the engine to the same scale as FIGURE 2.
Figure 5:
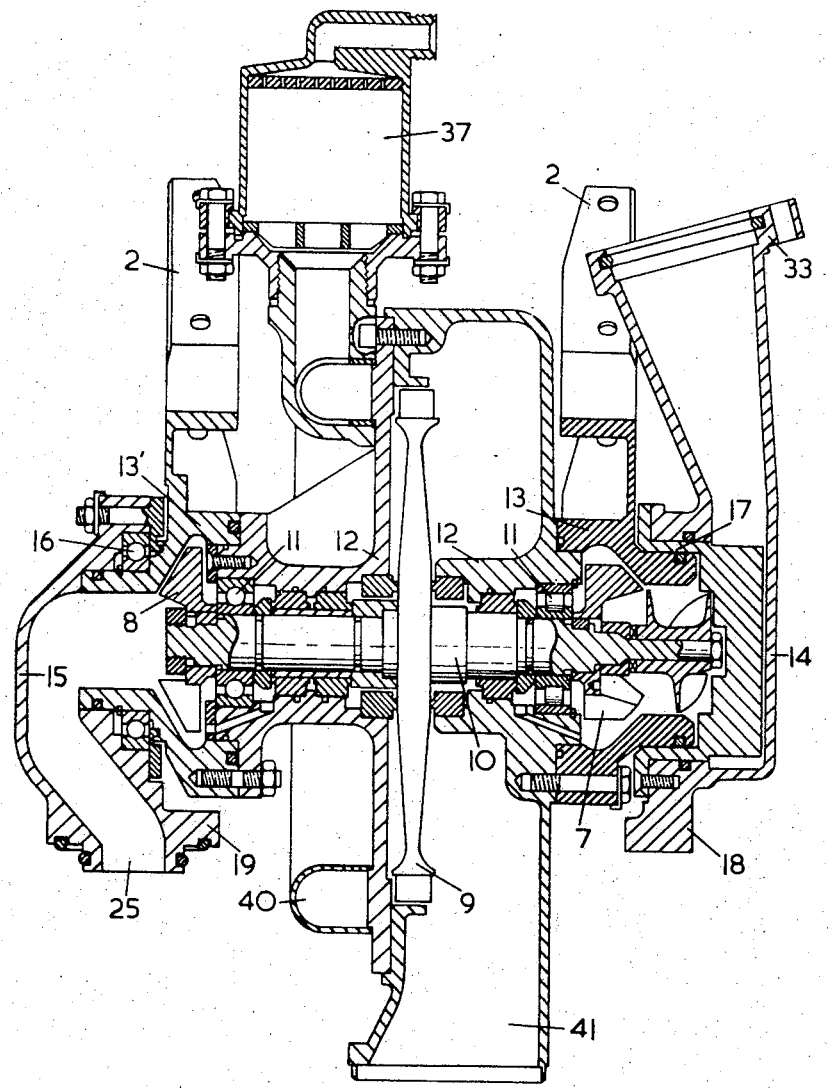
Figure 6:
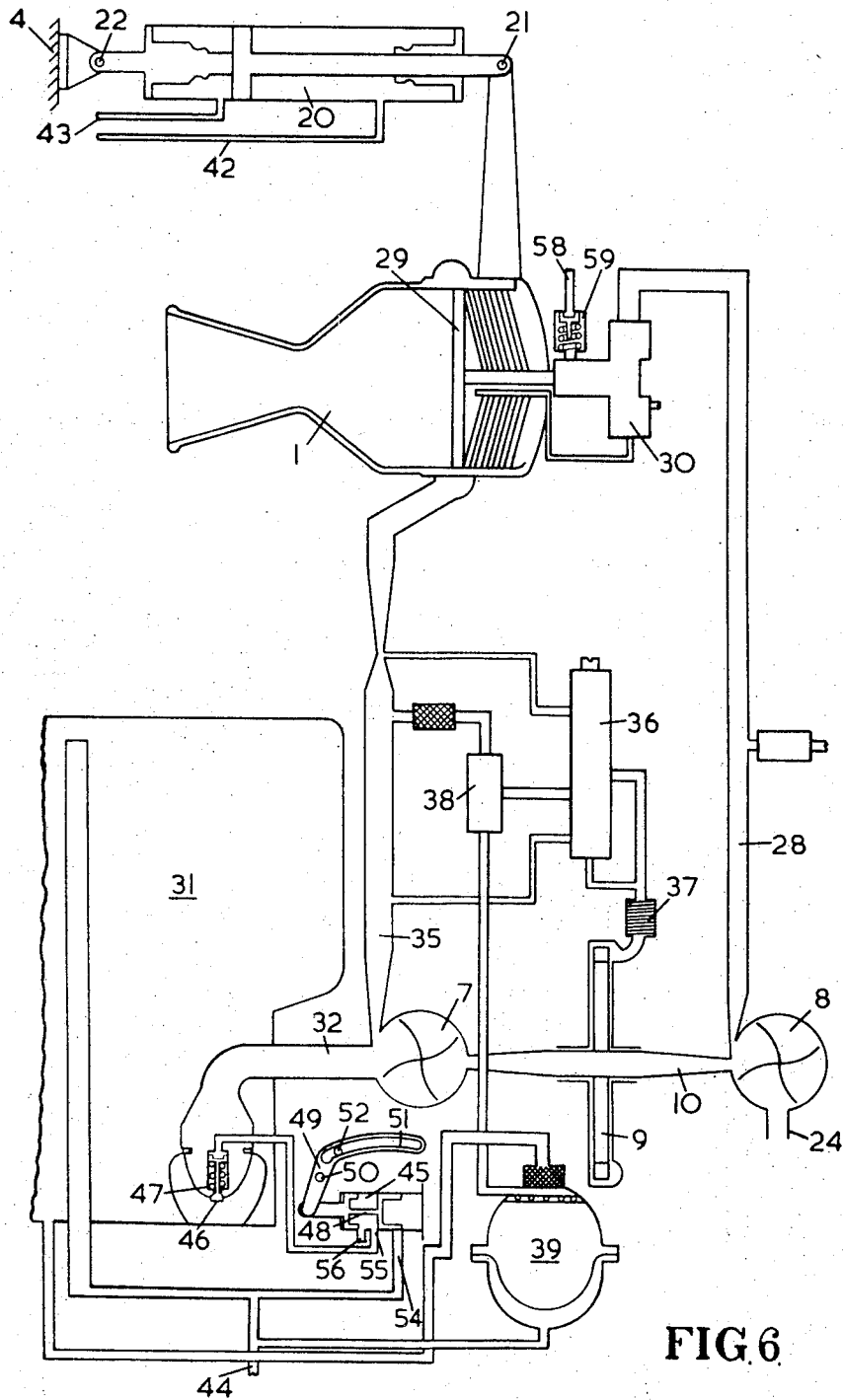

FIGURE 5 is a composite axial cross-section, to the same scale as FIGURE 4, through the pump and turbine assembly, the left-hand side of the figure being a section on the lines AOB in FIGURE 4 and the right-hand side of the figure being a section on the lines AOB' in FIGURE 2 and FIGURE 6 is a diagram showing the control circuit for supplying fuel and oxidant to the combustion chamber of the engine and for pivoting the engine.

Figure 1:
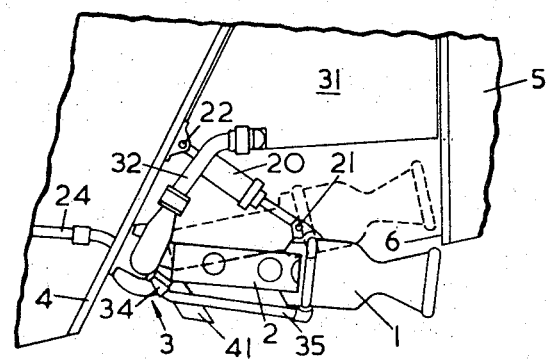
FIGURE 1 is a side view of the engine mounted in the fuselage of an aircraft and showing, in full lines, the operative position and, in broken lines, the retracted position of the engine.

FIGURE 1 shows the main part of the engine, namely the combustion chamber and nozzle 1, mounted on a supporting frame 2, which is itself supported by the outlet housings of a pair of rotary pumps, indicated generally (in FIGURE 1 only) by the arrow 3 and arranged co-axially with one another at the end of the frame remote from the combustion chamber, the common axis of rotation of the rotors of the pumps extending transversely of the longitudinal axis of the combustion chamber. The pump inlet housings are mounted on a fixed member 4 of an aircraft and form trunnion mountings about which the rotors of the pumps, their outlet housings, and the said main part of the engine are pivotable, whereby the engine can be swung from a retracted position, shown in broken lines, in which the engine is stowed within the fuselage 5 of the aircraft to an operative position, shown in full lines, in which at least the nozzle projects from an opening 6 in the fuselage. The thrust of the engine is transmitted to the aircraft through the trunnion mountings.

The pumps supply fuel and oxidant, e.g. hydrogen peroxide, respectively to the combustion chamber and are driven by a co-axial turbine positioned between them and also bodily pivotable with the main part of the engine about the common axis of the pumps and the turbine. Where the oxidant is hydrogen peroxide, the turbine is driven by steam produced by decomposition of hydrogen peroxide in a steam generator. This is described hereinafter with reference to FIGURE 6.

The mounting of the engine for pivotal movement about the axis of the pump and turbine unit is shown more clearly in FIGURES 2 to 5. Referring to FIGURE 5, the rotor of the hydrogen peroxide pump is indicated at 7, the rotor of the fuel pump at 8 and the turbine rotor at 9. The three rotors 7, 8 and 9 are mounted on a shaft 10, rotatable in bearings 11 in the housing 12 at the ends of which are fixed the pump-outlet housings 13, 13'. The housings 13, 13' are supported at their ends in housings 14 and 15 respectively defining the inlet ducts to the pumps. The housings 12, 13, 13' are rotatable relatively to the housings 14 and 15 by means of a ball bearing 16 at one end and cylindrical bearing surfaces 17 at the other end. The housings 14 and 15 have integral mounting feet 18 and 19 respectively by which the engine is attached to the fixed member 4. Thus the pump inlet housings 14 and 15 form a pair of trunnion mountings in which the pump outlet housings 13, 13', the housing 12, the frame 2, the combustion chamber and nozzle 1 and all the other components of the engine that are carried on the frame 2 are pivotable.

The pivoting of the engine between the operative and the retracted positions as shown in FIGURE 1 is effected by a fluid-operable ram 20 connected between a bracket 21 on the engine (see also FIGURES 2 and 3) and a bracket 22 on the fixed member 4. The fluid for operating the ram is compressed nitrogen and the control circuit for operating the ram will now be described with reference to FIGURE 6.

FIGURE 6 shows diagrammatically the combustion chamber and nozzle 1, the fuel pump, the hydrogen peroxide pump and the turbine. These three components are indicated by the reference numerals used for their rotors, i.e. 8, 7 and 9 respectively, and are shown connected by the shaft 10.

Fuel is led by a supply pipe 24 to a fuel inlet connection 25 (shown in FIGURES 3 to 5) from a fuel tank, not shown, mounted in the aircraft and is discharged from the pump 8 through an outlet connection 27 (see FIGURE 4) to a pipe 28 through which fuel is supplied to the burner assembly 29 of the combustion chamber through a shut-off valve 30, described and claimed in the specification of copending application No. 389,693, filed Aug. 14, 1964.

Hydrogen peroxide is supplied, as the oxidant, from a tank 31, see also FIGURE 1, through a pipe 32 to an inlet connection 33 (see FIGURE 2, 3 and 5) leading to the pump 7. Hydrogen peroxide is delivered by the pump 7 through an outlet connection 34 (see FIGURES 1 and 2) to a pipe 35 leading to the combustion chamber 1. Some of the hydrogen peroxide in the pipe 35 is diverted through a change-over valve 38 and a control valve 36 to a steam generator 37 (see also FIGURES 2 to 5) in which the hydrogen peroxide is decomposed, for supplying steam to the turbine 9. To enable the turbine to be started, hydrogen peroxide is delivered to the steam generator 37, through the change-over valve 38 and the control valve 36 from a starting tank 39, supplied by the hydrogen peroxide tank 31. The control valve 36 is described and claimed in the specification of copending application No. 389,694, filed Aug. 14, 1964 in which the starting tank 39 is also described. The steam from the generator 37 enters an inlet volute chamber 40 (see FIGURE 5) and the exhaust from the turbine passes through an outlet 31 see FIGURES 1, 2, 4 and 5).

A control circuit (not shown) for admitting nitrogen to the ram is connected by pipes 42 and 43 to the cylinder of the ram. The ram is shown in FIGURE 6 displaced in relation to the combustion chamber 1 and the member 4. A second pressurised nitrogen supply is admitted through a pipe 44 to pressurise the hydrogen peroxide in the supply tank 31 and in the starting tank 39. This supply of nitrogen is also passed through a valve 45 to a further valve 46, controlling the flow of hydrogen peroxide from the tank 31 to the pump 7. The valve 46 is held closed by a spring 47, except when pressurised nitrogen is supplied through the valve 45.

The valve 45 is mounted on a fixed part of the aircraft and not on the frame 2 and includes a valve member 48, which is arranged to be moved by one arm of a cranked lever 49 pivotally mounted at 50 to a fixed part of the aircraft. The arm of the lever remote from the valve member 48 has a longitudinally-extending curved slot 51 formed in it, the slot containing a pin 52 extending from the frame 2. As the frame 2 moves, when the engine is pivoted by the ram 20, the pin 52 will travel along the slot 51, without causing the lever 49 to turn about its pivot until the engine has almost reached its operational position, when the pin 52 will engage an offset portion of the end of the slot 51, as shown in FIGURE 2, and the valve member 48 will only then be moved to the central position in the housing 53 of the valve 45, thereby connecting together a pair of inlet and outlet ports 54, 55 respectively through which the nitrogen can pass to open the valve 46. When the engine is pivoted towards the retracted position, the initial movement of the pin 52 from the off-set portion to the main portion of the slot 51 causes the valve member 48 to be moved from the position shown in FIGURE 2 to the position shown in FIGURE 6, thereby closing the inlet port 54 and opening the outlet port 55 to a vent 56. Thus no nitrogen will then pass to the valve 46 and nitrogen between the valves 45 and 46 will be vented to atmosphere. In FIGure 6, the lever 49 and the pin 52 are shown displaced with respect to the combustion chamber 1 and the pump and turbine assembly.

A third supply of nitrogen is applied through the pipe 58 to a non-return valve 59 to purge the burner assembly 29 of fuel as described in copending application No. 389,693, filed Aug. 14, 1964.

By providing the axis of pivoting of the engine remote from the combustion chamber and nozzle 1, there is relatively little angular movement between the operative and the retracted positions and so the ejection of gases from the propulsive nozzle, when the engine is in its operative position, will be substantially in line with the line of flight of the aircraft. The co-axial arrangement of the pumps and the turbine about the axis of pivoting enables the whole engine to be made compact.

What we claim as our invention and desire to secure by Letters Patent of the United States is:

1. A rocket engine having co-axial rotary fuel and oxidant pumps, and a combustion chamber supplied by said pumps, the latter arranged at the upstream end of the combustion chamber with their common axis transverse to the longitudinal axis of the engine, and having trunnion mountings co-axial with the pumps, whereby the engine is pivotable about the said common axis between an operative position and an inoperative position.

2. A rocket engine as claimed in claim 1 including a turbine drivingly connected to said pumps, the latter arranged one at each end of the turbine and having respective inlets housings providing said trunnion mountings.

3. A rocket engine having co-axial rotary fuel and oxidant pumps, and a combustion chamber supplied by said pumps, the latter arranged at the upstream end of the combustion chamber with their common axis transverse to the longitudinal axis of the engine, and having trunnion mountings co-axial with the pumps, whereby the engine is pivotable about the said common axis between an operative position and an inoperative position, the engine also including means to interrupt the supply of at least one of the propellents, i.e. fuel or oxidant, to the combustion chamber except when the engine is in its operative position.

4. A rocket engine as claimed in claim 4 in which said means comprises a first valve through which oxidant is admitted to the oxidant pump, said valve being held open by the application thereto of a pressurised control fluid, a second valve acting to control the flow of said control fluid to said first valve, a lever, an actuating member therefor engageable with said lever, said lever and said actuating member being relatively movable on pivoting said engine, whereby said lever is pivoted to open said second valve when the engine is in its operative position and pivoted to close said second valve when the engine is moved from its operative position.

5. A rocket engine as claimed in claim 5 in which said lever is of such a shape that said second valve is only closed when said engine has almost reached its operational position and is opened during the initial part of the pivotal movement of the engine from its operational position.

References Cited

UNITED STATES PATENTS

| | | | |
|---|---|---|---|
| 2,506,976 | 5/1950 | Tharratt | 244—58 |
| 2,987,271 | 6/1961 | Heath et al. | 244—58 |
| 3,176,464 | 4/1965 | Meyer et al. | 60—35.55 |

MARK M. NEWMAN, *Primary Examiner.*

D. HART, *Assistant Examiner.*